US008489537B2

(12) United States Patent
Su et al.

(10) Patent No.: US 8,489,537 B2
(45) Date of Patent: Jul. 16, 2013

(54) SEGMENTING SEQUENTIAL DATA WITH A FINITE STATE MACHINE

(75) Inventors: Jie Su, Beijing (CN); Min Chu, Beijing (CN); Wenli Zhu, Beijing (CN); Jian Wang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 778 days.

(21) Appl. No.: 12/359,344

(22) Filed: Jan. 26, 2009

(65) Prior Publication Data

US 2010/0191693 A1 Jul. 29, 2010

(51) Int. Cl.
*G06F 17/00* (2006.01)
*G06N 5/02* (2006.01)

(52) U.S. Cl.
USPC .......................................................... 706/50

(58) Field of Classification Search
USPC ........................................... 706/50, 62
See application file for complete search history.

(56) References Cited

U.S. PATENT DOCUMENTS

| | | | |
|---|---|---|---|
| 5,983,180 A | | 11/1999 | Robinson |
| 6,049,332 A * | | 4/2000 | Boetje et al. .................. 715/721 |
| 6,108,714 A | | 8/2000 | Kumagai et al. |
| 6,473,757 B1 | | 10/2002 | Garofalakis |
| 6,785,663 B2 | | 8/2004 | Wang et al. |
| 7,188,340 B2 | | 3/2007 | Ostertag et al. |
| 7,508,985 B2 | | 3/2009 | Van Lunteren |
| 7,877,401 B1 | | 1/2011 | Hostetter et al. |
| 2003/0229471 A1 | | 12/2003 | Guralnik et al. |
| 2004/0024773 A1 | | 2/2004 | Stoffel et al. |
| 2004/0044528 A1 | | 3/2004 | Chelba et al. |
| 2004/0075698 A1 * | | 4/2004 | Gao et al. ...................... 345/854 |
| 2005/0005242 A1 | | 1/2005 | Hoyle |
| 2005/0071465 A1 | | 3/2005 | Zeng et al. |
| 2006/0279546 A1 | | 12/2006 | Karmazyn |
| 2007/0113170 A1 | | 5/2007 | Dignum et al. |
| 2009/0271720 A1 | | 10/2009 | Deshpande et al. |
| 2010/0191693 A1 | | 7/2010 | Su |

FOREIGN PATENT DOCUMENTS

WO       2006076760 A1      7/2006

OTHER PUBLICATIONS

Han et al.,"Frequent pattern mining: current status and future directions", Data Min Knowl Disc (2007) 15:55-86 DOI 10.1007/s10618-006-0059-1, Accepted: Nov. 8, 2006 / Published online: Jan. 27, 2007 Springer Science+Business Media, LLC 2007.*

(Continued)

*Primary Examiner* — Jeffrey A Gaffin
*Assistant Examiner* — Ilya Traktovenko
(74) *Attorney, Agent, or Firm* — Gonzalez Saggio & Harlan LLP (57) ABSTRACT

Described is a technology in which a finite state machine-based method segments original sequential data into high level units. Segments with similar sub-sequences are treated as the same unit. In general, the finite state machine indentifies sub-sequences in the sequential data that have similar tree-like microstructures. One described finite state machine operates by entering a path state when an input is a path command corresponding to a non-leaf node; the state machine remains in the path state until another command comprises an action command corresponding to a leaf node, whereby it outputs an action unit, or until the other command comprises a path command that is not the parent or the sibling of a next command, whereby a browsing unit is output. Also described is aggregating sub-sequences of a same unit to produce an access structure corresponding to the unit.

20 Claims, 8 Drawing Sheets

OTHER PUBLICATIONS

Fong et al, "Online Analytical Mining of Path Traversal Patterns for Web Measurement", Thesis (M .Phil.)—City University of Hong Kong, 2001, Publisher : Dept. of Computer Science, City University of Hong Kong, Issue Date: 2001.*

McCallum, at al., "Maximum Entropy Markov Models for Information Extraction and Segmentation", retrieved at << http://www.cs.iastate.edu/~honavar/memm-icml2000.pdf >>, 2000, pp. 8.

Lafferty, et al., "Conditional Random Fields: Probabilistic Models for Segmenting and Labeling Sequence Data", retrieved at << http://l2r.cs.uiuc.edu/~danr/Teaching/CS598-05/Papers/crf.pdf >>, pp. 8.

Gurevich, Yuri, "Sequential Abstract State Machines Capture Sequential Algorithms", retrieved at << http://research.microsoft.com/users/gurevich/Opera/141.pdf >>, pp. 32.

Bourlard, et al., "Hidden Markov Models and other Finite State Automata for Sequence Processing", retrieved at << http://www.idiap.ch/~bengio/cv/publications/pdf/handbook_2002.pdf >>, appeared in The Handbook of Brain Theory and Neural Networks, Second edition, (M.A. Arbib, Ed.), Cambridge, MA: The MIT Press, 2002, pp. 16.

Hong, P. et al.; "Constructing Finite State Machines for Fast Gesture Recognition;" Proceedings 15th ICPR; 2000; pp. 3695-3698.

Chang, C.-H. et al.; "IEPAD: Information Extraction based on Pattern Discovery;" Proceedings of the 10th International Conference on World Wide Web; Hong Kong; May 2-5, 2001; pp. 223-231.

Garofalakis, M. et al.; "SPIRIT: Sequential Pattern Mining with Regular Expression Constraints;" Proceedings of the 25th VLDB Conference; Edinburgh, Scotland; 1999.

Liu, J. et al.; "Similarity Comparison and Analysis of Sequential Data;" Proceedings of International Conference on Expert Systems for Development; Bangkok, Thailand; Mar. 28-31, 1994; pp. 138-143.

Conrad, G. et al.; "Pattern Discovery in Time-Ordered Data;" Sandia National Laboratories Report SAND2002-0245; Albuquerque, New Mexico; Feb. 2002.

Chen, "Mining Frequent tree-like patterns in large datasets;" 2006, pp. 65-83.

El-Ramly, "Mining Software Usage Data" 2004, Proceedings 1st International Workshop on Mining Software Repositories; pp. 64-68.

Rabiner, "An Introduction to Hidden Markov Models;" 1986, pp. 4-16.

* cited by examiner

SEGMENTING SEQUENTIAL DATA WITH A FINITE STATE MACHINE

CROSS REFERENCE TO RELATED APPLICATION

This patent application is related to U.S. patent application Ser. No. 12/359,343 filed concurrently herewith, and hereby incorporated by reference.

BACKGROUND

Discovery of sequential patterns is becoming increasingly useful and valuable in many scientific and commercial applications. Consider for example a Microsoft® Office command sequence. It is valuable information for Microsoft Corporation's developers and support personnel to know how the product is used, such as to know the answer to "What other features are used before or after feature X?" or "What do users do after they visit help?" or "Is feature X easy to find?" (which corresponds to knowing how many clicks are needed in order to execute command X).

However, some sequential data cannot be used as is, but rather needs to be segmented in order to be processed. Precisely segmenting such sequential data into suitable units is a desirable task.

Summary

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which sequential data is segmented into units. In one aspect, a finite state machine indentifies sub-sequences in the sequential data that have tree-like microstructures that are similar to one another.

In one aspect, the finite state machine operates by entering a path state when an input is a path command corresponding to a non-leaf node in the tree-like microstructure. Based upon another command, the state machine remains in the path state, or outputs an action unit or a browsing unit. The state machine outputs an action unit when the other command comprises an action command corresponding to a leaf node. The state machine outputs a browsing unit when the other command comprises a path command that is not the parent or the sibling of a next command, or remains in the path state when the other command comprises a path command that is the parent or the sibling of a next command.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards segmenting data sequences into units by indentifying sub-sequences with similar tree-like microstructures. In one implementation, this is automatically accomplished via a finite state machine (FSM) that captures the microstructure of sequential data. This allows aggregating sub-sequences belonging to the same unit to establish the structure of the unit.

While Microsoft® Office command sequences and the like are used as examples herein, it should be understood that any of the examples described herein are non-limiting examples. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and data processing in general.

Figure 1:
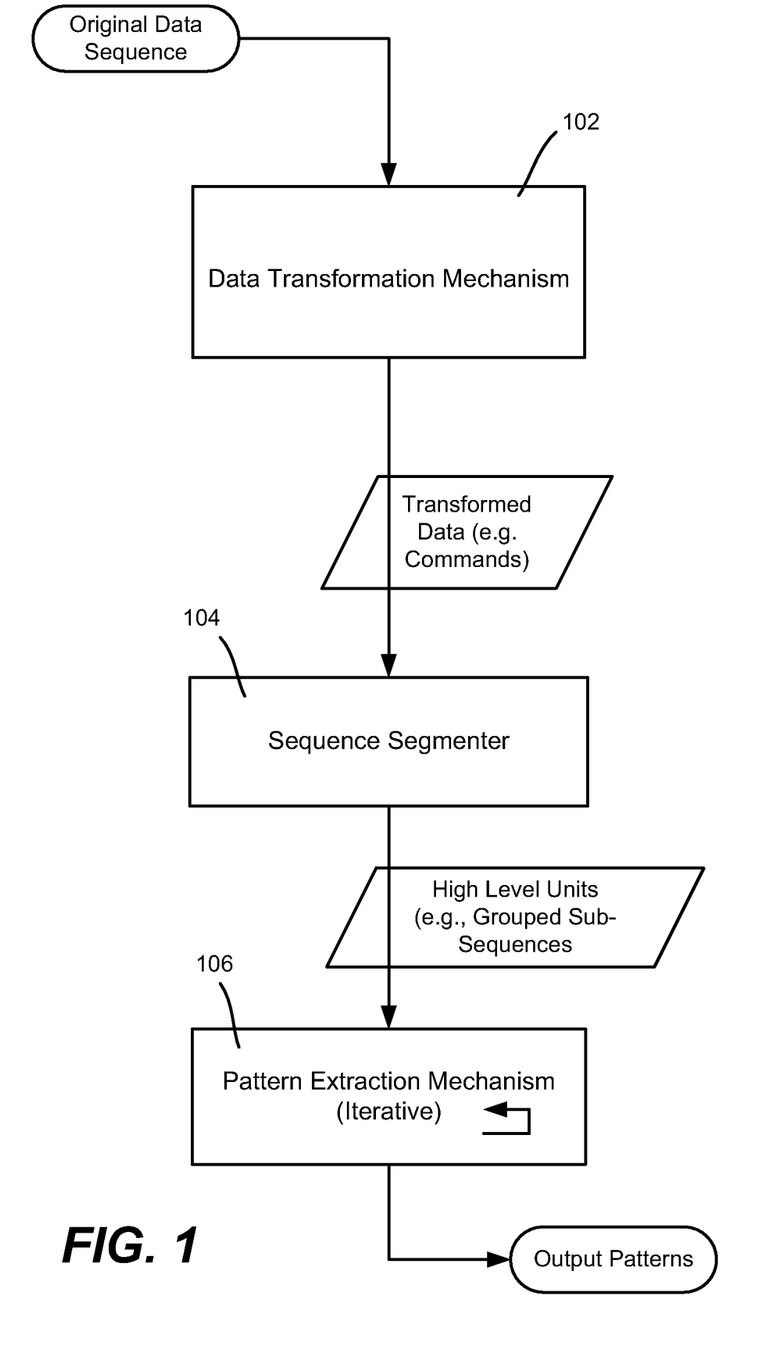
FIG. 1 is a block diagram showing an example environment in which segmenting sequential data into units is performed.

FIG. 1 shows an example environment in which a sequence segmentation of sequential data may be employed, namely pattern extraction as described in the aforementioned related U.S. patent application. By way of example of sequential data, in Microsoft® Office, a seven-dimensional vector is recorded for each click in Office Ribbon applications. The vector includes the command ID, its parent command ID, control location such as Tab, Low ribbon, Quick Access Tab. These recorded clicks form a raw command sequence.

In general, a data transformation mechanism 102 may preprocess the sequential data, such as to remove repeated commands, remove noisy commands, or group similar commands. As described herein, a sequence segmenter 104 segments the sequential data (which may be transformed) into units that are then provided to a pattern extraction mechanism 106 that finds.

In general, sequence segmentation via the sequence segmenter 104 segments the original sequence (following data transformation) into high level units in order to group similar sub-sequences together. In this way, more meaningful patterns are found, for example.

Figure 2:
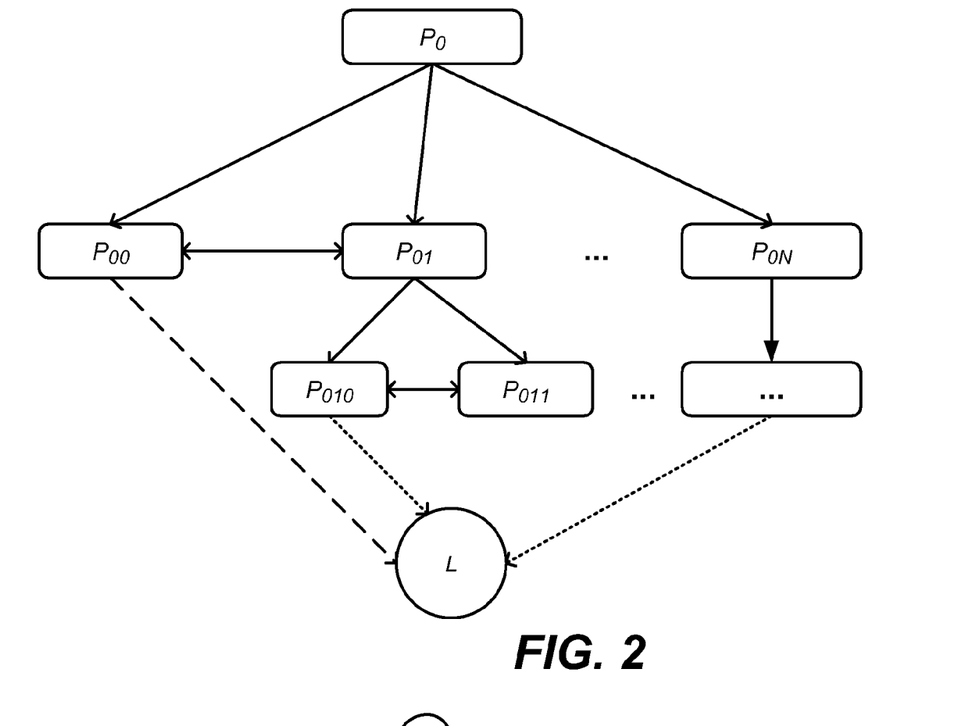
FIG. 2 is a representation of a tree-like microstructure in sequential data.

To segment the data, the sequence segmenter 104 identifies sub-sequences with similar tree-like microstructures. For example, some sequential data such as Office applications command sequences and web site browsing sequences are comprise sub-sequences which are in the form of a tree-like microstructure, as generally represented in FIG. 2. This tree-like microstructure contains two types of nodes, namely one or more leaf nodes and/or non-leaf nodes (path nodes). In these sequential data, the leaf nodes are the real target items, while non-leaf nodes stand for the paths need to be taken to access the leaf nodes.

There are four kinds of relationships between two nodes that are connected, namely Parent-Child (leaf, dotted arrow), Parent-Child (non-leaf, solid one-directional arrow), Sibling-Sibling (non-leaf, bidirectional arrow) and Sibling-Sibling (leaf, dashed arrow). As the arrows show, a non-leaf node may go to its child nodes or sibling nodes.

A sub-sequence which traverses in this structure following directions is recognized as a unit. In this way, the original sequence is segmented into units and a part of the units end with target items. In FIG. 2, there are many possible sub-sequences generated, such as $P_0P_{00}P_{01}P_{00}L$ (end with a target item L) and $P_0 P_{01}P_{010}P_{011}$ (end without a target item).

Figure 3:
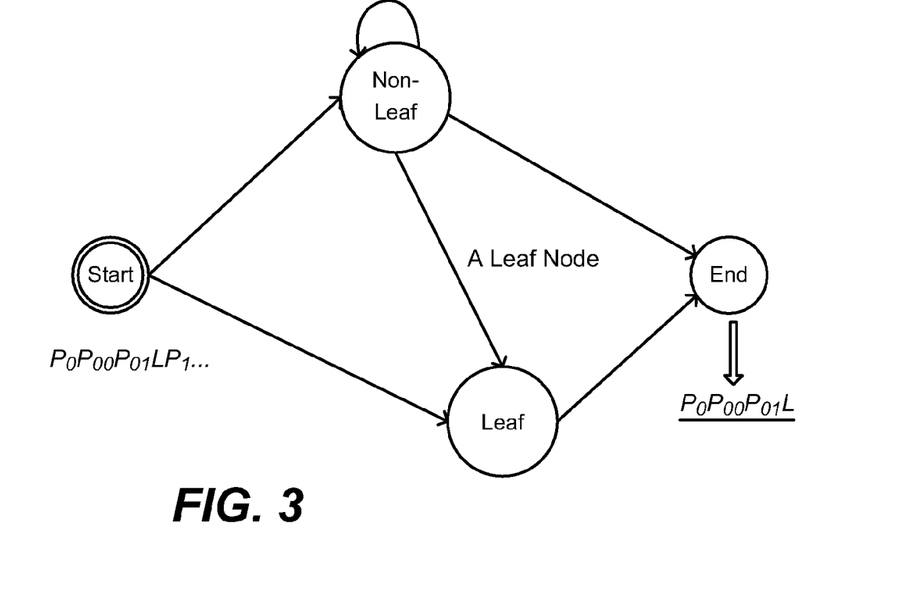
FIG. 3 is a representation of a finite state machine that captures sub-sequences of a tree-like microstructure.

To capture sub-sequences with tree-like microstructure, a finite state machine is used. More particularly, for a sequential data set $\{x_1, x_2, \ldots x_j\}$, which is generated by a symbol set $\{s_1, s_2, \ldots s_N\}$, the relationship of every pair of symbols $(s_i, s_j)$ is defined as one of the following: Parent-Child (leaf), Parent-Child(non-leaf), Sibling-Sibling (leaf), Sibling-Sibling (non-leaf), Leaf-Other and Nonleaf-Other. Then the original sequence is automatically segmented into sub-sequences by a finite state machine while each of the sub-sequence is a traverse in the tree-like microstructure. FIG. 3 shows a transition relation of the finite state machine and how the finite state machine recognizes the sub-sequence $P_0 P_{00}P_{01}P_{00}L$.

The formal definition of one suitable finite state machine is described as follows:

Finite State Machine: M

Input symbol set: {Null, Parent-Child (non-leaf), Parent-Child (leaf), Sibling-Sibling (non-leaf), Sibling-Sibling (leaf), Leaf-Other, Nonleaf-Other}

Initial state: $\{S_{start}\}$

End state: $\{S_{end}\}$

State set: $\{S_{Non-leaf}, S_{Leaf}\}$

Transition Table

| Current State | Input Symbol | | | |
|---|---|---|---|---|
| | $S_{Start}$ | $S_{Non-leaf}$ | $S_{Leaf}$ | $S_{end}$ |
| Null | N/A | N/A | $S_{end}$ | $S_{Start}$ |
| Parent-Child (non-leaf) | $S_{Non-leaf}$ | $S_{Non-leaf}$ | N/A | N/A |
| Parent-Child (leaf) | $S_{Non-leaf}$ | $S_{Non-leaf}$ | N/A | N/A |
| Sibling-Sibling (non-leaf) | $S_{Non-leaf}$ | $S_{Non-leaf}$ | N/A | N/A |
| Sibling-Sibling (leaf) | $S_{Non-leaf}$ | $S_{Non-leaf}$ | N/A | N/A |
| Nonleaf-Other | $S_{end}$ | $S_{end}$ | N/A | N/A |
| Leaf-Other | $S_{Leaf}$ | $S_{Leaf}$ | N/A | N/A |

Figure 4:
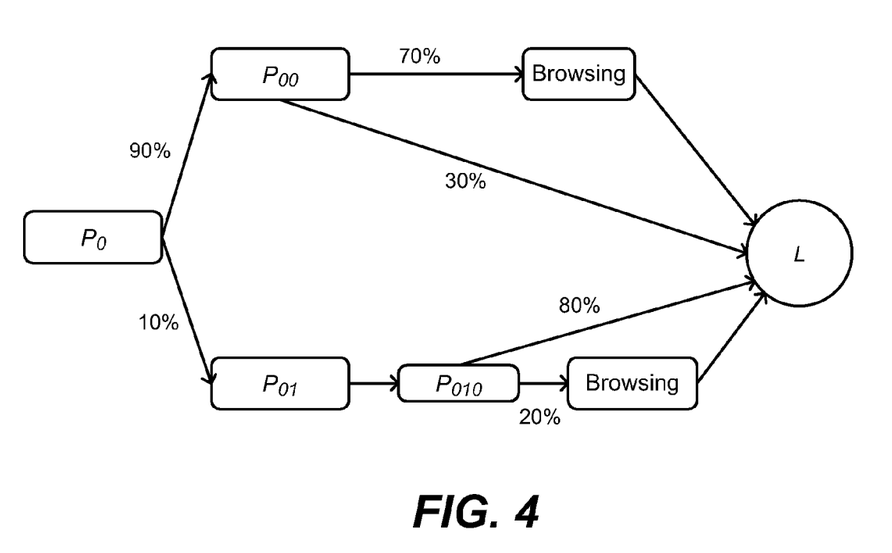
FIG. 4 is a representation of an access structure of a leaf node.

The sequence segmenter 104 aggregates together sub-sequences that lead to the same target item to show the access structure of the target item. To this end, some of the sub-sequences generated by segmentation end with the same leaf node. By aggregating these similar sub-sequences together, the sequence segmenter 104 is able to explore the access structure of this leaf node. FIG. 4 shows a sample access structure for a leaf-node L.

By way of example, Microsoft® Office command sequence data will be described herein. In many Office applications, the commands are organized as a tree-structure in the user interface, from a root to a leaf. Leaf commands normally correspond to actions that users want to take, while non-leaf commands mostly serve as the path leading to leaf commands. Thus, two types of multi-command units are defined, namely an action unit comprising a tree traverse ending with a leaf command (e.g. File—FileSaveAsMenu—WordTemplate) and a browsing unit comprising a tree traverse that did not reach a leaf command, (e.g. File—FileSaveAsMenu—FilePrintMenu).

Figure 5:
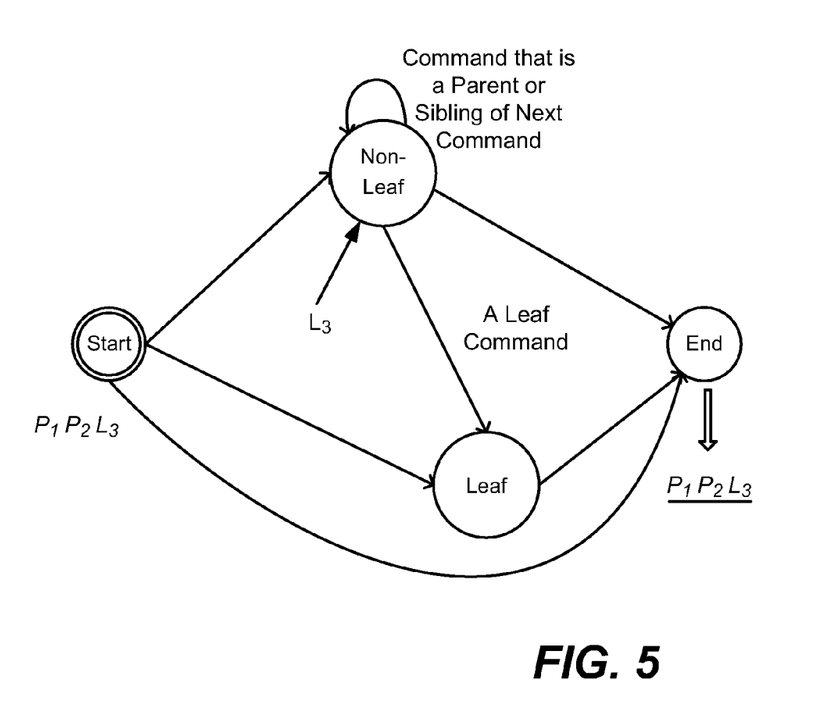
FIG. 5 is a representation of a finite state machine that extracts action and browsing units based on input commands of an application program.

Action and browsing units can be extracted from the command stream with a finite state machine as shown in FIG. 5. In FIG. 5, P1 represents the File menu, P2 represents the Save As menu, and L3 represents a Word template.

Figure 6:
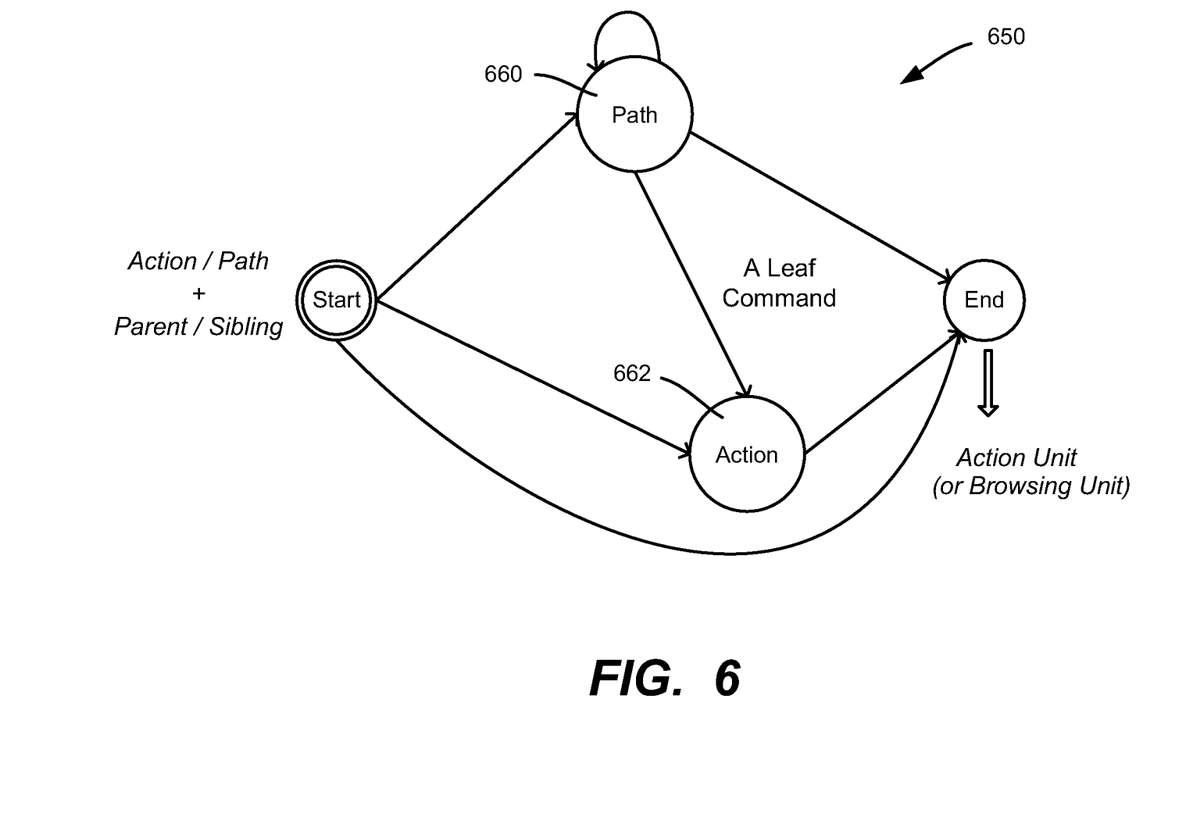
FIG. 6 is a representation of a generalized finite state machine that extracts action and browsing units based on input data and a current state.

To summarize with a more general finite state machine 650 of FIG. 6 (relative to the finite state machine of FIG. 5), a leaf command corresponds to an action, while a non-leaf command corresponds to a path, providing two types of units, namely an action unit for a tree traverse from the root to a leaf command, and a browsing unit for a tree traverse that does not reach a leaf command. As shown in FIG. 6, the finite state machine 650 has only two states 660 and 662, and the input contains two types of information, one of which is whether a command is an action command, or a path command leading to actions. A second type of information indicates whether the command is the parent or the sibling of the next command. If the input is a path command and it is the parent or the sibling of the next command, the finite state machine 650 goes to a path state 660 and stays there until an action command is received. Once an action command is received, the finite state machine 650 turns to the action state 662 and terminates automatically. As the result, an action unit is output. Each action unit in the unit sequence may correspond to many chunks of commands in the command sequence.

Note that when the finite state machine 650 is in the path state 660 and a path command that is not the parent or the sibling of the next command is received, it terminates and outputs a browsing unit. With this finite state machine 650, the command sequence is converted into an action/browsing unit sequence. Note that the described finite state machine is applicable to most applications that have a tree structured user interface.

Figure 7:
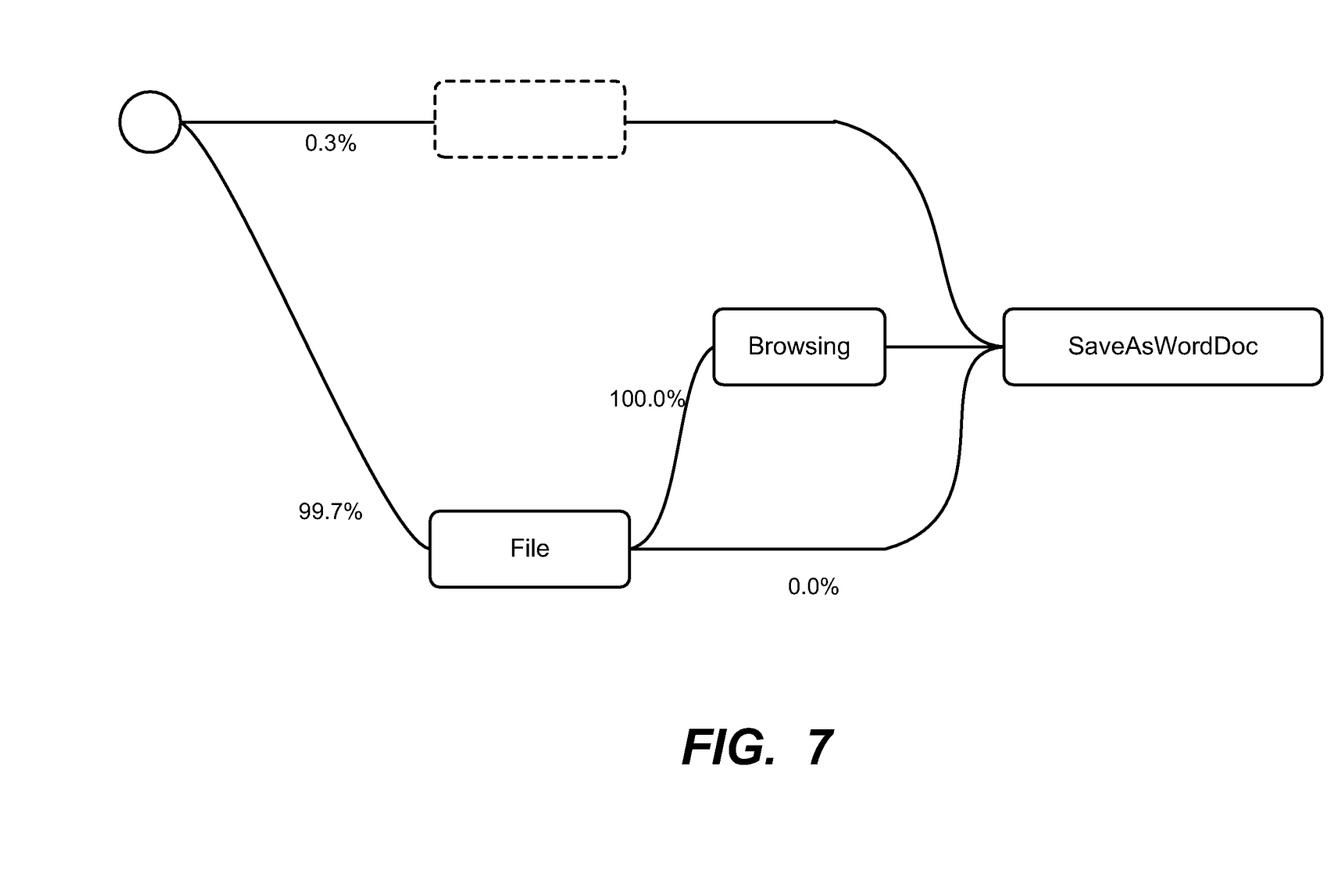
FIG. 7 is a representation of an example access path based upon an example word processing command.

The units may be aggregated together to show how users access the action from the user interface. With the aggregated information of the units ending with the same leaf command, questions such as "How do users access feature X?" may be answered. FIG. 7 is a representation of the output of one analysis tool that has analyzed the access path of the command "Word Template" (which is called "SaveAsWordDotx" in the data). As can be seen, the process of segmenting sequential data into units builds higher-level structures upon the original sequence data, which is useful for data analysis such as pattern mining to get more meaningful results.

Figure 8:
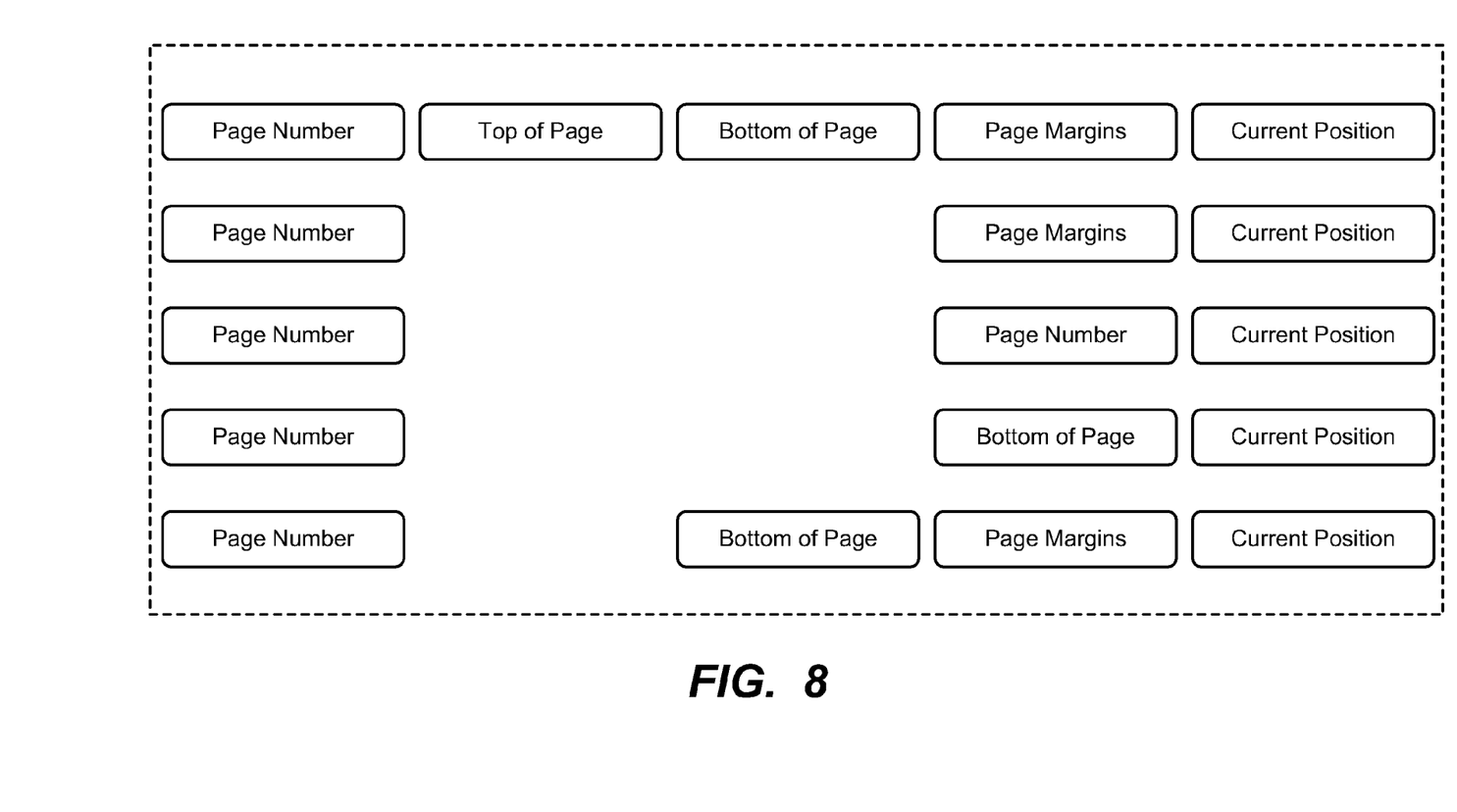
FIG. 8 is a representation of patterns extracted from original sequence data.

By way of another example, consider comparing the patterns extracted on an original sequence and on segmented units, e.g., using the command "Format Page Number" in Office Word, which provides choices for "Top of Page", "Bottom of Page", "Page Margin" and "Current Position" as generally ordered below:

Page Number→Top of Page
   Bottom of Page
   Page Margin
   Current Position If the pattern extraction algorithm of the aforementioned patent application is applied to the original sequence, the patterns in FIG. 8 result. In FIG. 8, the first pattern contains five commands, each corresponding to a user interface item of "Top of Page", "Bottom of Page", "Page Margin" and "Current Position". Many users click the 'Page Number' and go from the top of the menu though the "Current Position" item. If they have not moved the mouse fast enough, each item on the way automatically results in further action in which a command is recorded to reflect that action; (in practice, many similar patterns are found). A main difference is in the number of items expanded, which is related to the movement speed of the mouse. Such patterns mainly show the micro behaviors on the user interface, which does not indicate what users do before and after inserting a page number.

Figure 9:
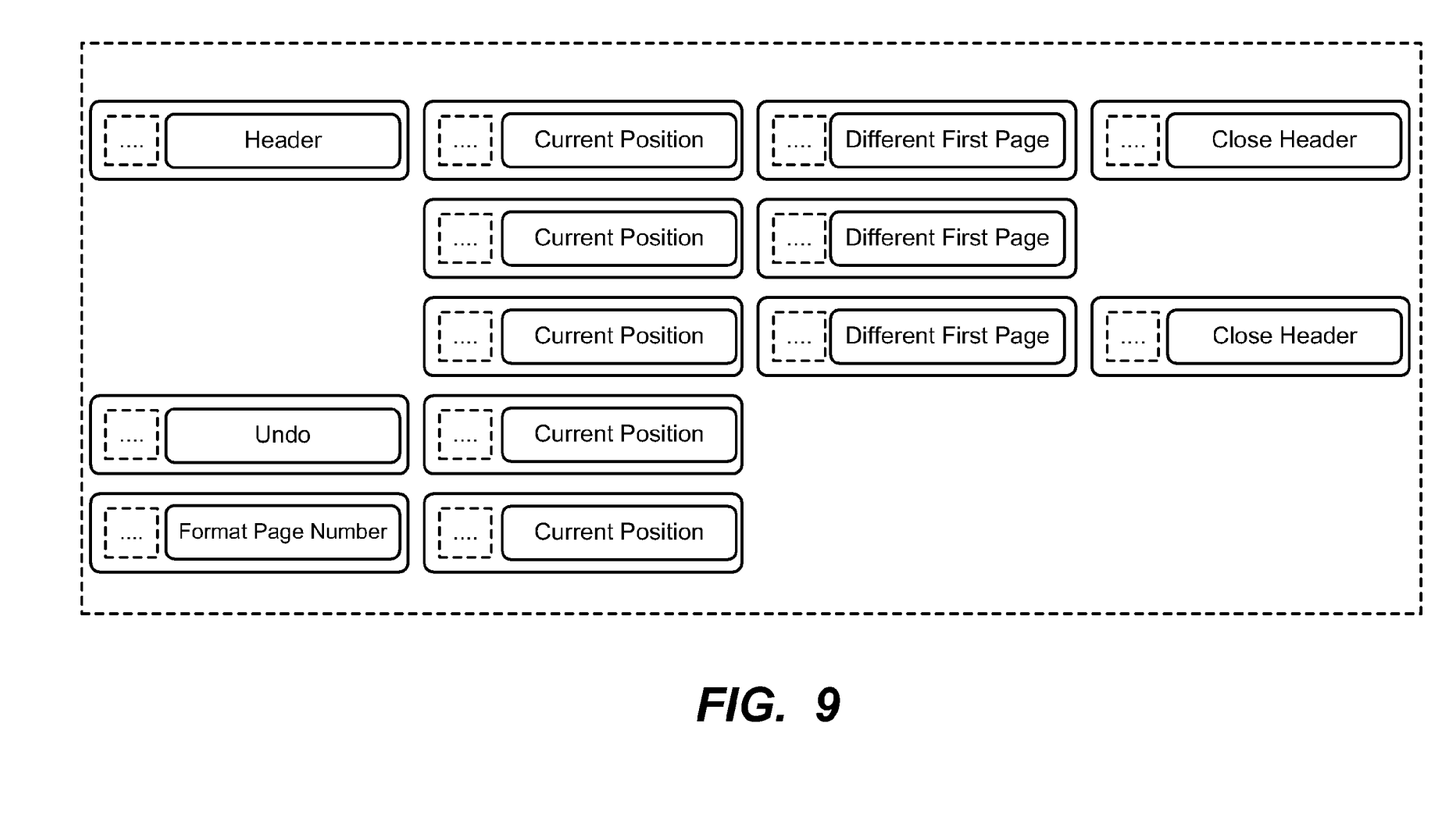
FIG. 9 is a representation of patterns extracted from sequence that has been segmented into units.

FIG. 9 shows the patterns extracted from a sequence that contains multi-command units. As can be seen, there are more macro usage patterns found, whereby the user behavior is easy to interpret.

Exemplary Operating Environment

Figure 10:
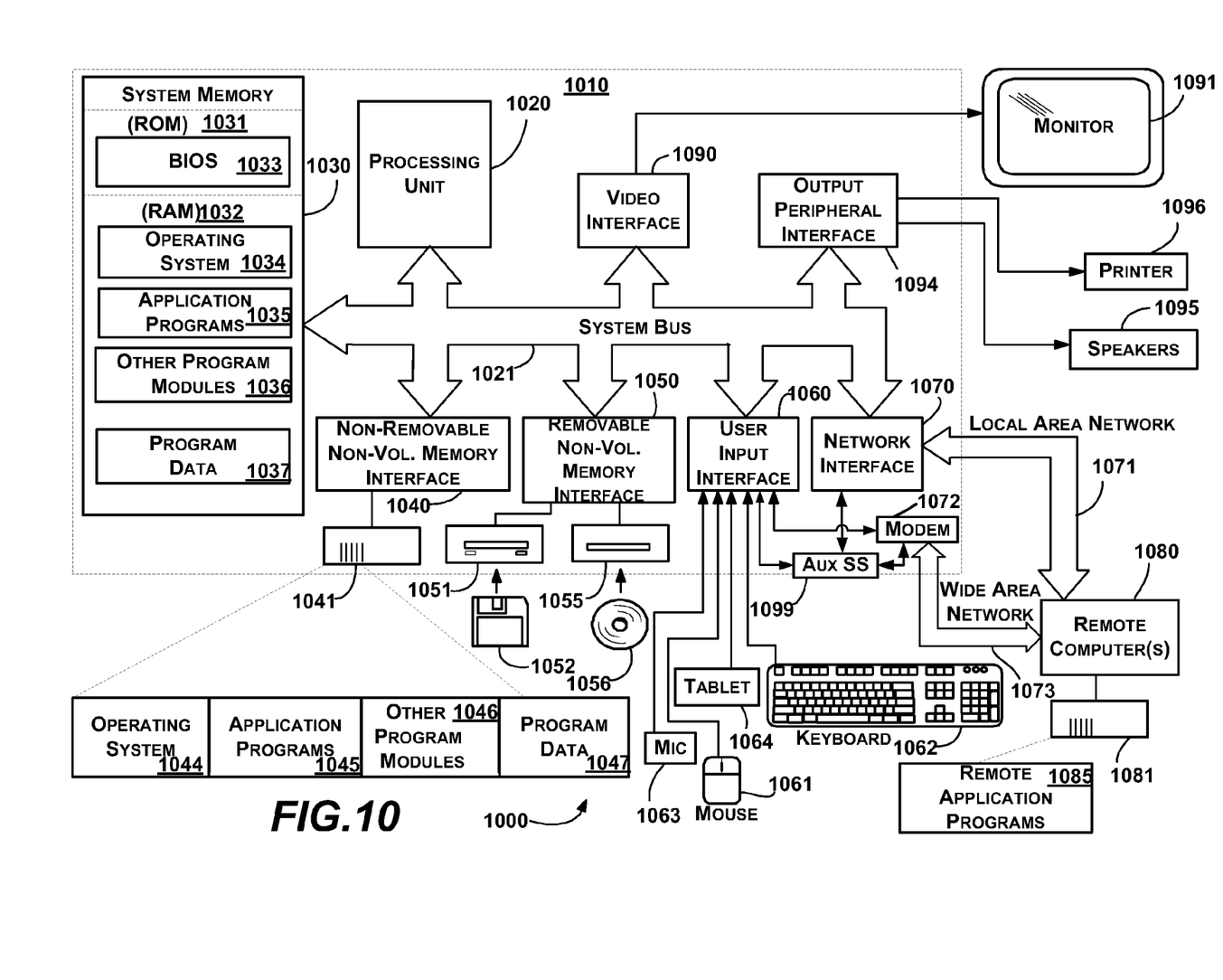
FIG. 10 shows an illustrative example of a computing environment into which various aspects of the present invention may be incorporated.

FIG. 10 illustrates an example of a suitable computing and networking environment 1000 on which the examples of FIGS. 1-9 may be implemented. The computing system environment 1000 is only one example of a suitable computing environment and is not intended to suggest any limitation as to the scope of use or functionality of the invention. Neither should the computing environment 1000 be interpreted as having any dependency or requirement relating to any one or combination of components illustrated in the exemplary operating environment 1000.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 10, an exemplary system for implementing various aspects of the invention may include a general purpose computing device in the form of a computer 1010. Components of the computer 1010 may include, but are not limited to, a processing unit 1020, a system memory 1030, and a system bus 1021 that couples various system components including the system memory to the processing unit 1020. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1010 typically includes a variety of computer-readable media. Computer-readable media can be any available media that can be accessed by the computer 1010 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1010. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1030 includes computer storage media in the form of volatile and/or nonvolatile memory such as read only memory (ROM) 1031 and random access memory (RAM) 1032. A basic input/output system 1033 (BIOS), containing the basic routines that help to transfer information between elements within computer 1010, such as during start-up, is typically stored in ROM 1031. RAM 1032 typically contains data and/or program modules that are immediately accessible to and/or presently being operated on by processing unit 1020. By way of example, and not limitation, FIG. 10 illustrates operating system 1034, application programs 1035, other program modules 1036 and program data 1037.

The computer 1010 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface, such as interface 1050.

The drives and their associated computer storage media, described above and illustrated in FIG. 10, provide storage of computer-readable instructions, data structures, program modules and other data for the computer 1010. In FIG. 10, for example, hard disk drive 1041 is illustrated as storing operating system 1044, application programs 1045, other program modules 1046 and program data 1047. Note that these components can either be the same as or different from operating system 1034, application programs 1035, other program modules 1036, and program data 1037. Operating system 1044, application programs 1045, other program modules 1046, and program data 1047 are given different numbers herein to illustrate that, at a minimum, they are different copies. A user may enter commands and information into the computer 1010 through input devices such as a tablet, or electronic digitizer, 1064, a microphone 1063, a keyboard 1062 and pointing device 1061, commonly referred to as mouse, trackball or touch pad. Other input devices not shown in FIG. 10 may include a joystick, game pad, satellite dish, scanner, or the like. These and other input devices are often connected to the processing unit 1020 through a user input interface 1060 that is coupled to the system bus, but may be connected by other interface and bus structures, such as a parallel port, game port or a universal serial bus (USB). A monitor 1091 or other type of display device is also connected to the system bus 1021 via an interface, such as a video interface 1090. The monitor 1091 may also be integrated with a touch-screen panel or the like. Note that the monitor and/or touch screen panel can be physically coupled to a housing in which the computing device 1010 is incorporated, such as in a tablet-type personal computer. In addition, computers such as the computing device 1010 may also include other peripheral output devices such as speakers 1095 and printer 1096, which may be connected through an output peripheral interface 1094 or the like.

The computer 1010 may operate in a networked environment using logical connections to one or more remote computers, such as a remote computer 1080. The remote computer 1080 may be a personal computer, a server, a router, a network PC, a peer device or other common network node, and typically includes many or all of the elements described above relative to the computer 1010, although only a memory storage device 1081 has been illustrated in FIG. 10. The logical connections depicted in FIG. 10 include one or more local area networks (LAN) 1071 and one or more wide area networks (WAN) 1073, but may also include other networks. Such networking environments are commonplace in offices, enterprise-wide computer networks, intranets and the Internet.

When used in a LAN networking environment, the computer 1010 is connected to the LAN 1071 through a network interface or adapter 1070. When used in a WAN networking environment, the computer 1010 typically includes a modem 1072 or other means for establishing communications over the WAN 1073, such as the Internet. The modem 1072, which may be internal or external, may be connected to the system bus 1021 via the user input interface 1060 or other appropriate mechanism. A wireless networking component 1074 such as comprising an interface and antenna may be coupled through a suitable device such as an access point or peer computer to a WAN or LAN. In a networked environment, program modules depicted relative to the computer 1010, or portions thereof, may be stored in the remote memory storage device. By way of example, and not limitation, FIG. 10 illustrates remote application programs 1085 as residing on memory device 1081. It may be appreciated that the network connections shown are exemplary and other means of establishing a communications link between the computers may be used.

An auxiliary subsystem 1099 (e.g., for auxiliary display of content) may be connected via the user interface 1060 to allow data such as program content, system status and event notifications to be provided to the user, even if the main portions of the computer system are in a low power state. The auxiliary subsystem 1099 may be connected to the modem 1072 and/or network interface 1070 to allow communication between these systems while the main processing unit 1020 is in a low power state.

Conclusion

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents failing within the spirit and scope of the invention.

What is claimed is:

1. In a computing environment, a method comprising:
   segmenting sequential data into one or more units, including identifying one or more sub-sequences in the sequential data that traverse a tree structure and have a tree-like microstructure, wherein a unit is a sub-sequence that traverses the tree structure following directions to lead to a target item;
   grouping the one or more units into unit aggregates, wherein each unit aggregate includes a set of one or more sub-sequences that lead to a same target item, and wherein the set of one or more sub-sequences of the each unit aggregate has similar tree-like microstructures; and
   providing the unit aggregates to a pattern extraction mechanism that extracts patterns based upon the one or more units.

2. The method of claim 1 wherein the sequential data corresponds to commands, and wherein grouping the one or more units into unit aggregates comprises determining action units that traverse the tree structure and end with a leaf command.

3. The method of claim 1 wherein the sequential data corresponds to commands, and wherein grouping the one or more units into unit aggregates comprises determining browsing units that traverse the tree structure and end without reaching a leaf command.

4. The method of claim 1 wherein identifying the one or more sub-sequences in the sequential data comprises using a finite state machine to process the tree-like microstructure.

5. The method of claim 1 wherein identifying the one or more sub-sequences comprises determining whether each sub-sequence that traverses a tree-like microstructures follows relationship directions to a leaf node, and if so, selecting that sub-sequence as a unit.

6. The method of claim 5 wherein the relationships include parent node to a child leaf node, parent node to a child non-leaf node, sibling node to a sibling leaf node and sibling node to a sibling non-leaf node.

7. The method of claim 1 wherein each unit aggregate provides an access structure corresponding to the target item associated with the each unit aggregate.

8. In a computing environment, a system comprising:
   a segmenter configured to segment sequential data into one or more units using a finite state machine to identify one or more sub-sequences in the sequential data that traverse a tree structure and have a tree-like microstructure, wherein a unit comprises a sub-sequence that traverses the tree structure following directions to lead to a target item, the segmenter further configured to group the one or more units into unit aggregates, wherein each unit aggregate includes a set of one or more sub-sequences that lead to a same target item, wherein the set of one or more sub-sequences of the each unit aggregate has similar tree-like microstructures, and wherein the segmenter is coupled to a pattern extraction mechanism that extracts patterns based upon the one or more units.

9. The system of claim 8 wherein the segmenter is coupled to a data transformation mechanism that preprocesses the sequential data into transformed data.

10. The system of claim 8 wherein the sequential data corresponds to commands, and wherein the segmenter is configured to group similar sub-sequences into a unit aggregate by determining action units that traverse a tree and end with a leaf command.

11. The system of claim 10 wherein the finite state machine determines an action unit by entering a path state when an input comprises a path command corresponding to a non-leaf node, and outputting the action unit when an action command corresponding to a leaf node is received while in the path state.

12. The system of claim 8 wherein the sequential data corresponds to commands, and wherein the segmenter is configured to group similar sub-sequences into a unit aggregate by determining browsing units that traverse a tree and end without reaching a leaf command.

13. The system of claim 12 wherein the finite state machine determines a browsing unit by entering a path state when an input comprises a path command corresponding to a non-leaf node, and outputting the browsing unit when a path command that is neither a parent nor a sibling of a next command is received.

14. The system of claim 8 further comprising means for aggregating sub-sequences of the same unit aggregate to produce an access structure corresponding to the unit aggregate.

15. One or more computer-readable storage media storing computer-executable instructions, which in response to execution by a computer, cause the computer to perform steps, comprising:
  segmenting sequential data into one or more units using a finite state machine to identify one or more sub-sequences in the sequential data that traverse a tree structure and have a tree-like microstructure, wherein a unit is a sub-sequence that traverses the tree structure following directions to lead to a target item, the finite state machine operating by entering a path state when an input is a path command corresponding to a non-leaf node, and remaining in the path state, or outputting an action unit or a browsing unit, based upon another command; and
  providing the one or more units to a pattern extraction mechanism that extracts patterns based upon the one or more units.

16. The one or more computer-readable storage media of claim 15 wherein the state machine outputs an action unit when the other command comprises an action command corresponding to a leaf node.

17. The one or more computer-readable storage media of claim 15 wherein the state machine outputs a browsing unit when the other command comprises a path command that is not the parent or the sibling of a next command, or remains in the path state when the other command comprises a path command that is the parent or the sibling of a next command.

18. The one or more computer-readable storage media of claim 15 wherein segmenting the sequential data comprises grouping similar sub-sequences into a unit aggregate.

19. The one or more computer-readable storage media of claim 15 having further computer-executable instructions comprising aggregating sub-sequences of a same unit aggregate to produce an access structure corresponding to the unit aggregate.

20. The one or more computer-readable storage media of claim 15 having further computer-executable instructions comprising preprocessing the sequential data into transformed data using a data transformation mechanism.

* * * * *